US009507875B2

(12) United States Patent
Reddy (10) Patent No.: US 9,507,875 B2
(45) Date of Patent: Nov. 29, 2016

(54) SYMBOLIC HYPER-GRAPH DATABASE

(75) Inventor: Subodh M. Reddy, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 411 days.

(21) Appl. No.: 13/370,022

(22) Filed: Feb. 9, 2012

(65) Prior Publication Data

US 2013/0212131 A1      Aug. 15, 2013

(51) Int. Cl.
  *G06F 17/30*    (2006.01)
(52) U.S. Cl.
  CPC ... *G06F 17/30958* (2013.01); *G06F 17/30961* (2013.01)
(58) Field of Classification Search
  CPC ............ G06F 17/30283; G06F 17/30312; G06F 17/30587; G06F 17/30946; G06F 17/30958; G06F 17/30961
  See application file for complete search history.

(56) References Cited

U.S. PATENT DOCUMENTS

| | | | | |
|---|---|---|---|---|
| 7,143,194 | B1* | 11/2006 | Curley | G06F 17/30581 707/999.002 |
| 7,890,518 | B2 | 2/2011 | Aasman | |
| 7,933,915 | B2 | 4/2011 | Singh et al. | |
| 2002/0161846 | A1* | 10/2002 | Ulrich | G06F 9/5083 709/213 |
| 2003/0195885 | A1* | 10/2003 | Emmick | G06F 17/30917 |
| 2007/0106767 | A1* | 5/2007 | Yamamoto et al. | 709/223 |
| 2007/0198789 | A1* | 8/2007 | Clark | G06F 11/1448 711/162 |
| 2009/0024590 | A1 | 1/2009 | Sturge et al. | |
| 2009/0157627 | A1* | 6/2009 | Arthursson | G06F 9/45504 |
| 2009/0157641 | A1* | 6/2009 | Andersen et al. | 707/4 |
| 2010/0318498 | A1* | 12/2010 | Swarnakar | G06F 17/30339 707/693 |
| 2011/0060711 | A1* | 3/2011 | Macready et al. | 706/46 |
| 2012/0209886 | A1* | 8/2012 | Henderson | 707/798 |
| 2013/0124545 | A1* | 5/2013 | Holmberg et al. | 707/756 |

OTHER PUBLICATIONS

Mince—A Static Global Variable-Ordering Heuristic for SAT Search and BDD Manipulation—by Aloul et al. IN: Jn'l Universal Computer Science, vol. 10, No. 12 (2004), pp. 1562-1596. Available at: http://www.jucs.org/jucs_10_12/mince_a_static_global/Aloul_F_A.pdf.*
"HypergraphDB: A Generalized Graph Database," by Iordanov, Borislav. IN: Lecture Notes in Computer Science vol. 6185 (2010). Available at: SpringerLink.*
"Zero-Suppressed BDD's and their Applications," by Minato, Shin-ichi. IN: Int J STTT (2001). Available at: SpringerLink.*
"Survey of Graph Database Performance on the HPC Scalable Graph Analysis Benchmark," by Dominguez-Sal et al. IN: WAIM 2010 Workshops (2010). Available at: SpringerLink.*
Multi-Terminal Binary Decision Diagrams: an Efficient Data Structure for Matrix Representation, by Fujita et al. IN: Formal Methods in System Design (1997). Available at: SpringerLink.*
"Automatic symbolic compositional verification by learning assumptions," by Nam et al. IN: Form Methods Syst. Des. (2008). Available at: SpringerLink.*
"An Introduction to Solving Interactive Configuration Problems," by Hadzic & Andersen. IN: IT Univ. Technical Report Series TR-2004-49 (2004). Available at: http://www.itu.dk/people/tarik/compendium/Introduction%20to%20conf%20problems.pdf.*

(Continued)

*Primary Examiner* — Daniel Kinsaul
(74) *Attorney, Agent, or Firm* — Maschoff Brennan (57) ABSTRACT

A graph database is described. The graph database includes one or more symbolic data stores and one or more key-value data stores. Each symbolic data store is configured to symbolically store sets of multiple hyper-graph nodes. Each key-value data store is configured to store attribute information for hyper-graph nodes and hyper-graph edges.

17 Claims, 10 Drawing Sheets

(56) References Cited

OTHER PUBLICATIONS

"Graph Models for Reachability Analysis of Concurrent Programs," by Pezze et al. IN: ACM Transactions on Software Engineering and Metholdology, vol. 4, No. 2, pp. 171-213 (1995). Available at: ACM.*

"An Introduction to Zero-Suppressed Binary Decision Diagrams," by Mishenko, Alan. IN: Dept. of Electrical and Computer Engineering Portland State University (2001). Available at:http://www.eecs.berkeley.edu/~alanmi/publications/2001/tech01_zdd.pdf.*

"Symbolic Topological Sorting with OBDDs," by Woelfel, Philipp. IN: J'nl Discrete Algorithms 4 (2006) 51-71. Available at: ScienceDirect.com.*

"IETF UUID draft specification," by Network Working Group (1998). Available at: http://www.opengroup.org/dce/info/draft-leach-uuids-guids-01.txt.*

"Zero-Suppressed BDDs for Set Manipulation in Combinatorial Problems," by Minato, Shin-ichi. IN: 30th ACM/IEEE Design Automation Conf. (1993). Available at: IEEE.*

"HypergraphDB-Presentation," by Kobrix Software. Web archive copy available as early as Jan. 2011. Available at: http://www.hypergraphdb.org/learn (last visited Aug. 31, 2013).*

"Logic Sysnthesis and Verification—Spring 2010," by Jiang, Jie-Hong (screenshots and class materials from classes between Feb. 26-Mar. 19, 2013 provided). Available at: http://alcom.ee.ntu.edu.tw/~jhjiang/instruction/courses/spring10-lsv/lsv-lecture.html (last visited Aug. 31, 2013).*

"Survey of Graph Database Models," by Angles & Gutierrez. IN: J'nl ACM Computing Surveys, vol. 40, Is. 1 (2008). Available at: ACM.*

* cited by examiner

SYMBOLIC HYPER-GRAPH DATABASE

FIELD

Example embodiments discussed herein are related to graph databases.

BACKGROUND

Many software applications employ structured query language (SQL) databases as part of larger relational database management systems (RDBMS). Due to the ever-increasing amount of data being generated, SQL databases are proving to be inadequate. In particular, SQL databases have proven inadequate to efficiently store and retrieve data that tracks relationships between entities. As a result of the inadequacies of SQL databases, various NoSQL databases, also known as "not only SQL databases", have been developed to better handle relational data. One example NoSQL database is a graph database.

A graph database uses graph structures with nodes, edges, and attributes to represent and store data. Methods of storing graph structures in databases and querying a graph database have been developed. These methods, however, do not generally support storing hyper-graphs or are based on using a particular schema. Further, current graph databases are not capable of storing ever-increasing graph data, which may be relatively large in size, in a distributed and efficient manner.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a graph database includes one or more symbolic data stores and one or more key-value data stores. Each symbolic data store is configured to symbolically store sets of multiple hyper-graph nodes. Each key-value data store is configured to store attribute information for hyper-graph nodes and hyper-graph edges.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

Example embodiments will be described and explained with additional specificity and detail through the use of the accompanying drawings in which.

DESCRIPTION OF EMBODIMENTS

Some embodiments described herein include a symbolic hyper-graph database. The symbolic hyper-graph database includes both a symbolic data store and a key-value data store. The symbolic storage of graph data in the symbolic data store may enable the storage of increasing graph data, which is relatively large in size, in a distributed and efficient manner.

Embodiments of the present invention will be explained with reference to the accompanying drawings.

Figure 1:
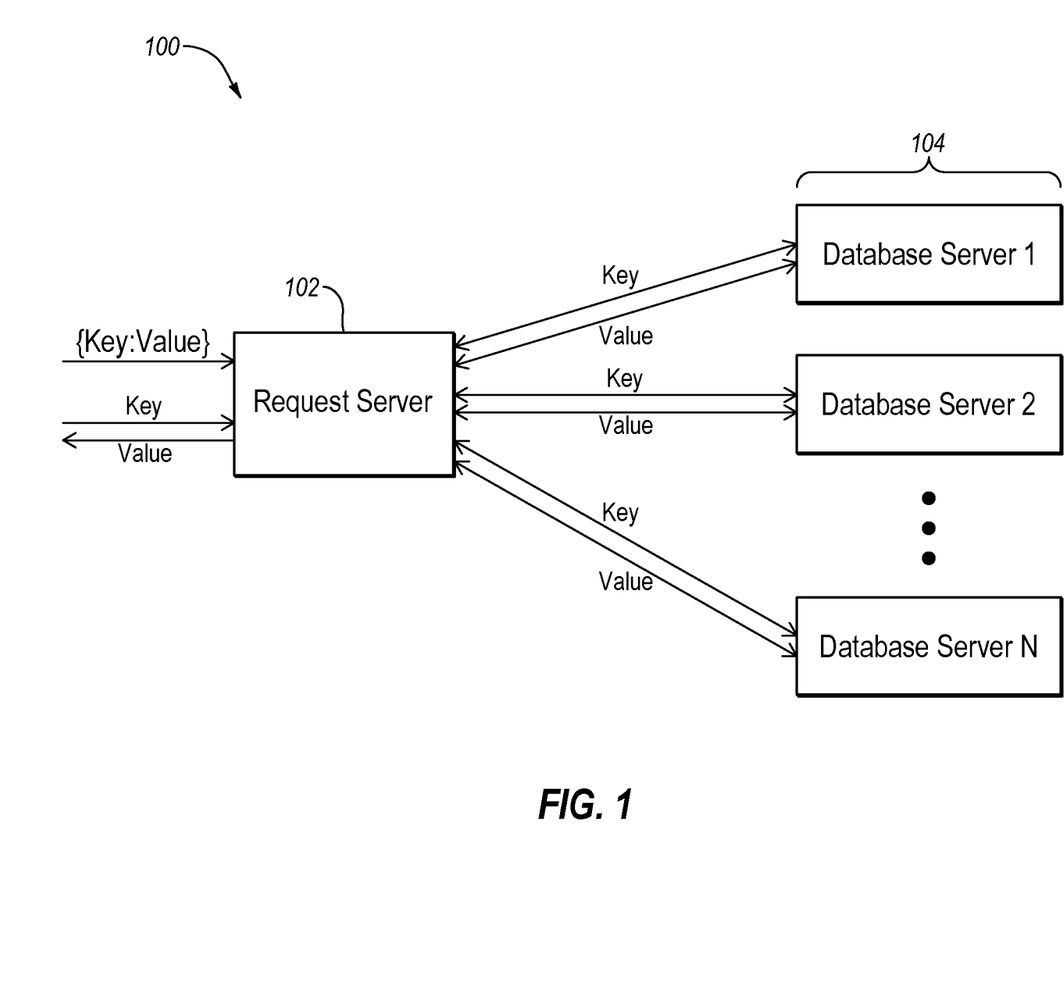
FIG. 1 illustrates an example operating environment in which embodiments of a symbolic hyper-graph database may be implemented.

FIG. 1 illustrates an example operating environment 100 in which a symbolic hyper-graph database may be implemented, arranged in accordance with at least some embodiments described herein. The operating environment 100 may include, for instance, a request server 102 and N distributed database servers 104. The request server 102 is configured to store graph database information on the database servers 104 and retrieve graph database information from the database servers 104. The graph database information may be sent and received as key-value information. When graph database information is stored, the request server 102 sends both a key and a value to the appropriate database server 104. When graph database information is retrieved, the request server 102 sends only a key to the appropriate database server 104.

A key is generally a unique identifier that identifies a node in a graph or a set of nodes in a graph. The N distributed database servers 104 allow the request server 102 to distribute a graph database across multiple servers, thus making the operating environment 100 of FIG. 1 a distributed environment. In the distributed environment of FIG. 1, a key may include a first component that identifies a particular one of the database servers 104 where a desired node or set of nodes is stored or will be stored and a second component that uniquely identifies the desired node or set of nodes.

Figure 2:
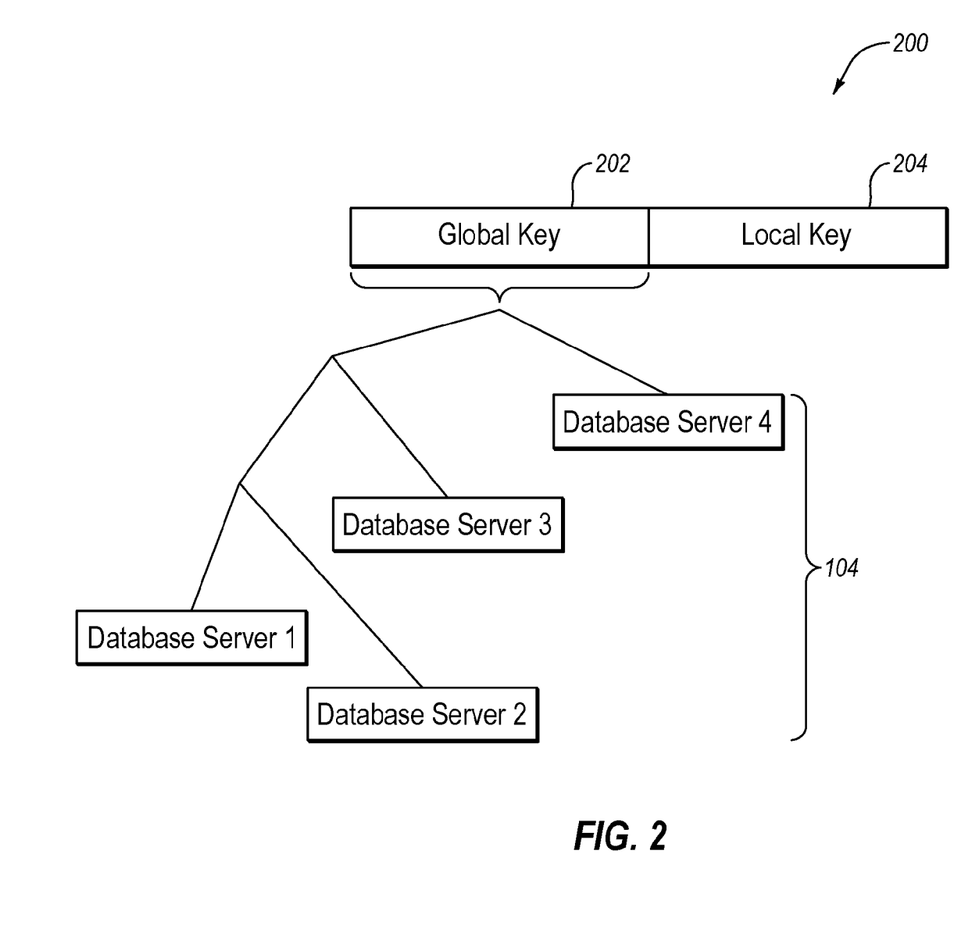
FIG. 2 schematically illustrates a key that may be used in embodiments of a symbolic hyper-graph database.

For example, FIG. 2 schematically illustrates a key 200 that may be used in embodiments of a symbolic hyper-graph database. The key 200 includes a global key 202 that identifies the particular database server 104 in a distributed group of interconnected database servers in which the desired node or set of nodes is stored or will be stored. The key 200 also includes a local key 204 that uniquely identifies the desired node or set of nodes on the particular database server 104.

As disclosed in FIG. 2, the global key 202 may be structured as a binary tree. When the request server 102 of FIG. 1 receives a request to store or retrieve graph database information, the request server may examine the global key 202 component of the key 200 received in the request to determine which of the database servers 104 should handle the request.

For example, where there are four database servers 104 as disclosed in FIG. 2, the global key 202 may be the binary integer 00 for database server 1, the binary integer 01 for database server 2, the binary integer 10 for database server 3, and the binary integer 11 for database server 4. Then, depending on which server is associated with a particular node or set of nodes, the global key 202 of the desired node or set of nodes may be set to the appropriate binary integer to allow the request server 102 to quickly route a request to the appropriate server. In this example, if more database servers 104 are added as the graph database grows, the binary integer global keys 202 of the keys 200 for the database servers 1-4 may simply be padded with leading zeros to accommodate the expansion of the number of binary digits in the global key 202 component of the key 200. Thus, the key 200 allows for the size of the graph database to easily scale as the amount of graph data grows. It is further noted that the local key 204 need only be unique for all the nodes or sets of nodes on a given database server 104 because the addition of the global key 202 will make the composite key 200 unique.

Figure 3:
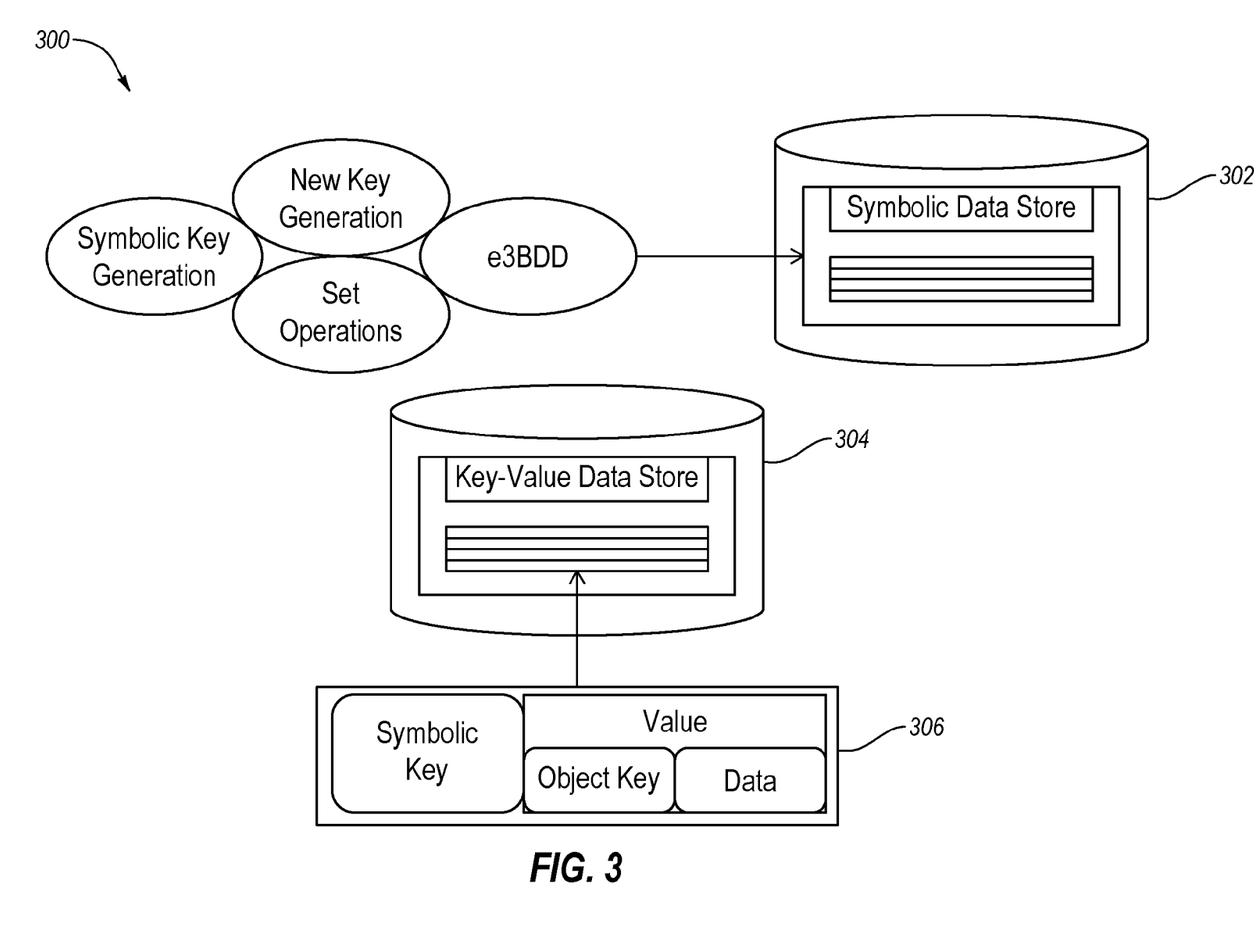
FIG. 3 is a block diagram of an example symbolic data store and an example key-value data store of an example symbolic hyper-graph database.

FIG. 3 is a block diagram of an example symbolic data store 302 and an example key-value data store 304 of an example symbolic hyper-graph database 300. Although the example symbolic hyper-graph database 300 includes only a single symbolic data store 302 and a single key-value data store 304, where the example symbolic hyper-graph database 300 is distributed across multiple database servers, such as the N database servers 104 of FIG. 1, each of the database servers may include a pair of symbolic and key-value data stores.

As disclosed in FIG. 3, the symbolic data store 302 is configured to symbolically store sets of multiple hyper-graph nodes. For example, each set of multiple hyper-graph nodes may be symbolically stored as any form of binary decision diagram (BDD). One form of BDD that may be employed by the symbolic data store 302 is a three element BDD (e3BDD), which will be discussed in greater detail below in connection with FIGS. 5A-6. The symbolic data store 302 may also be employed in connection with new key generation for individual hyper-graph nodes, set operations for sets of multiple hyper-graph nodes, and symbolic key generation for hyper-graph nodes and sets of multiple hyper-graph nodes. Due to the symbolic nature of the symbolic data store 302, set operations, such as union, intersection, difference, and member-of operations, may be computed efficiently. Further, the results of set operations may be localized to a local data store or to a set of closely located data stores so that these results may be made available in a very efficient manner.

The key-value data store 304 is configured to store attribute information for hyper-graph nodes and hyper-graph edges. For example, a key-value pair 306 may employ a symbolic key that identifies a hyper-graph node or a set of multiple hyper-graph nodes. The key-value pair 306 may employ a value that includes both an object key and data. For example, where each hyper-graph node represents a person, the symbolic key in the key-value pair 306 may uniquely identify a person, and the value may include an object key of "name" and a data of "John Doe."

Thus, the example symbolic hyper-graph database 300 is configured to store a hyper-graph in a bifurcated database with two separate data stores, namely, the symbolic data store 302 and the key-value data store 304.

Figure 4A:
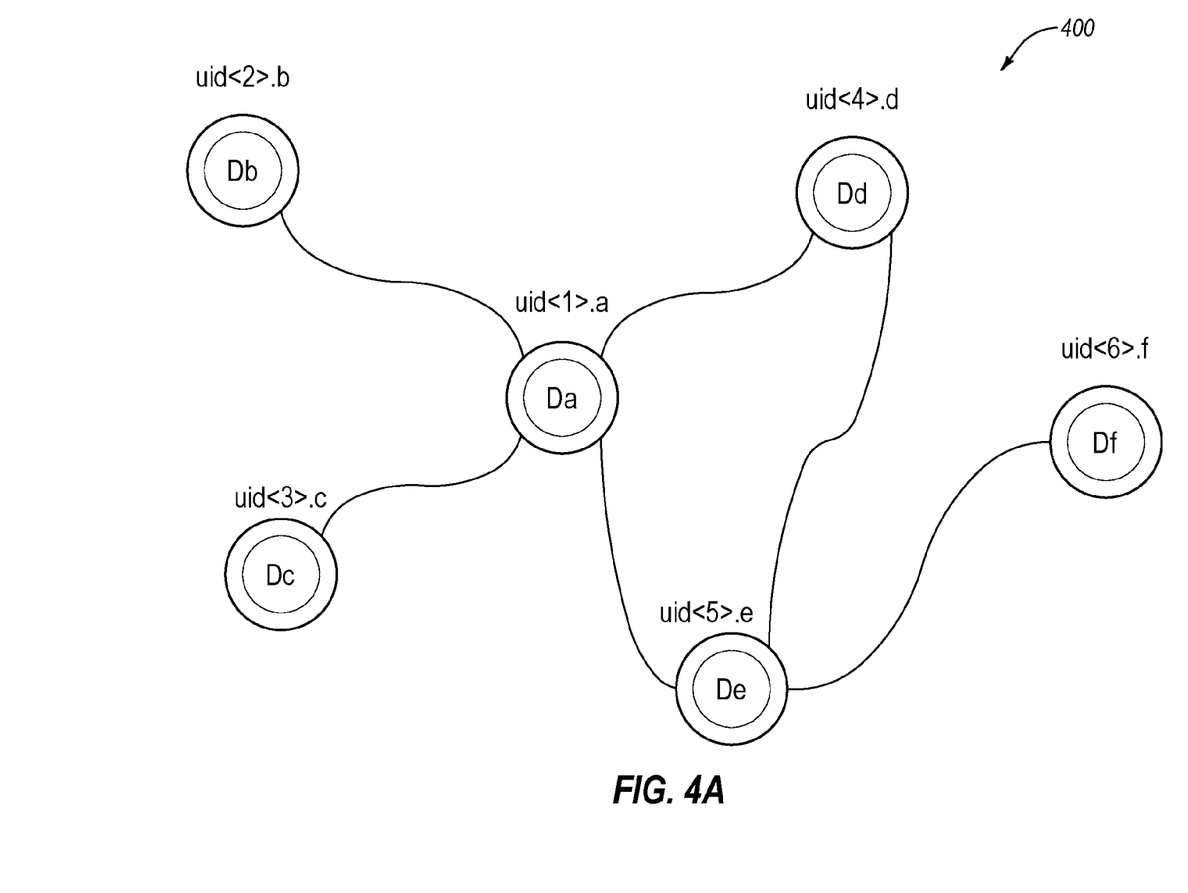
FIG. 4A schematically illustrates an example hyper-graph.

For example, as disclosed in FIG. 4A, an example hyper-graph 400 may include nodes with example unique identifiers 1-6 and edges connecting the various nodes. Each of the nodes may generally represent an entity such as a person, a business, an account, a documents, etc. Each edge drawn between two nodes generally represents a relationship between the two nodes. Each node may and each edge may include attributes that further define the entity represented by the node or the relationship represented by the edge, respectively. Where two edges represent the same relationship, those edges are similar.

Figure 4B:
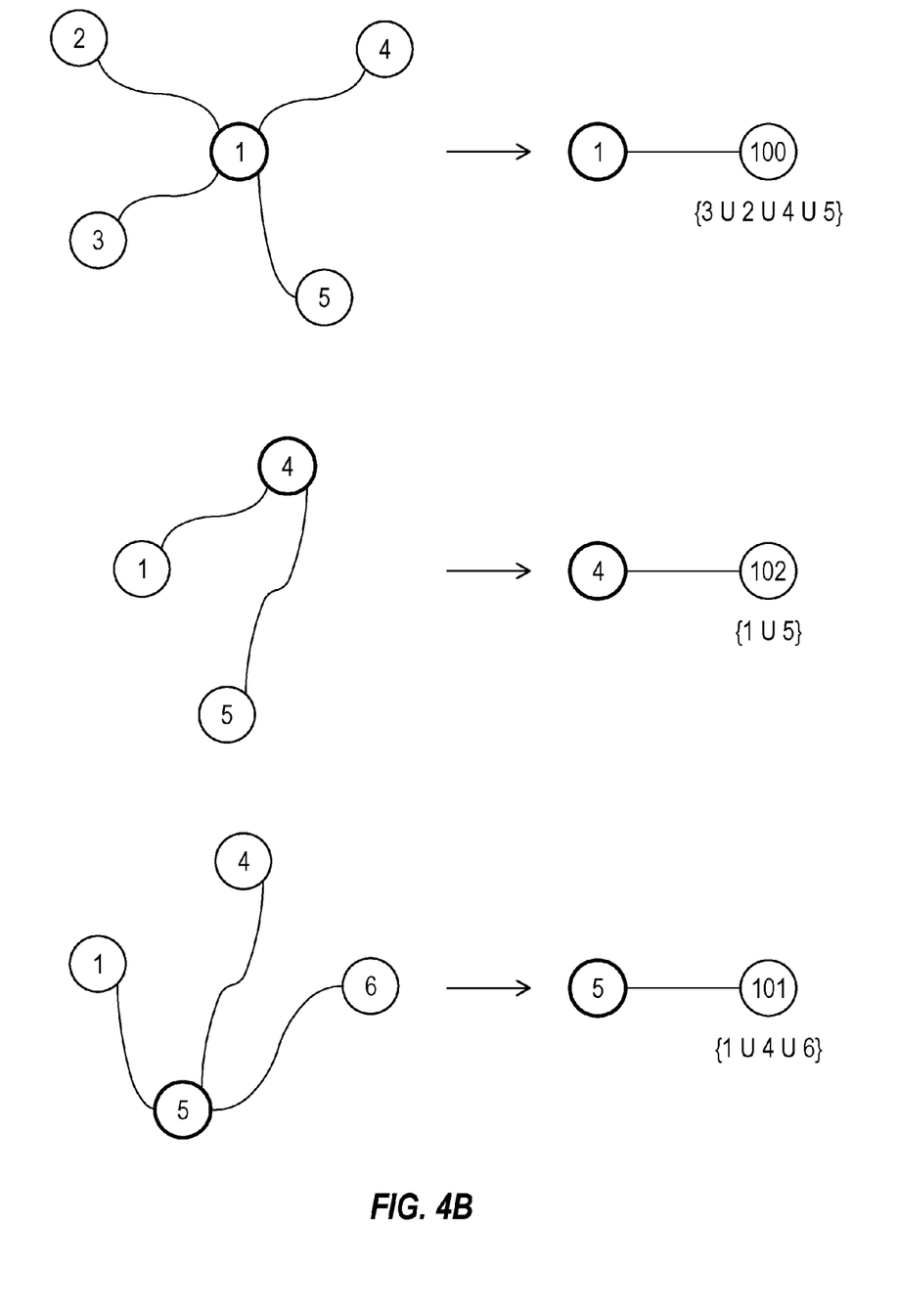
FIG. 4B schematically illustrates a process flow for symbolically storing sets of multiple hyper-graph nodes.
Figure 4C:
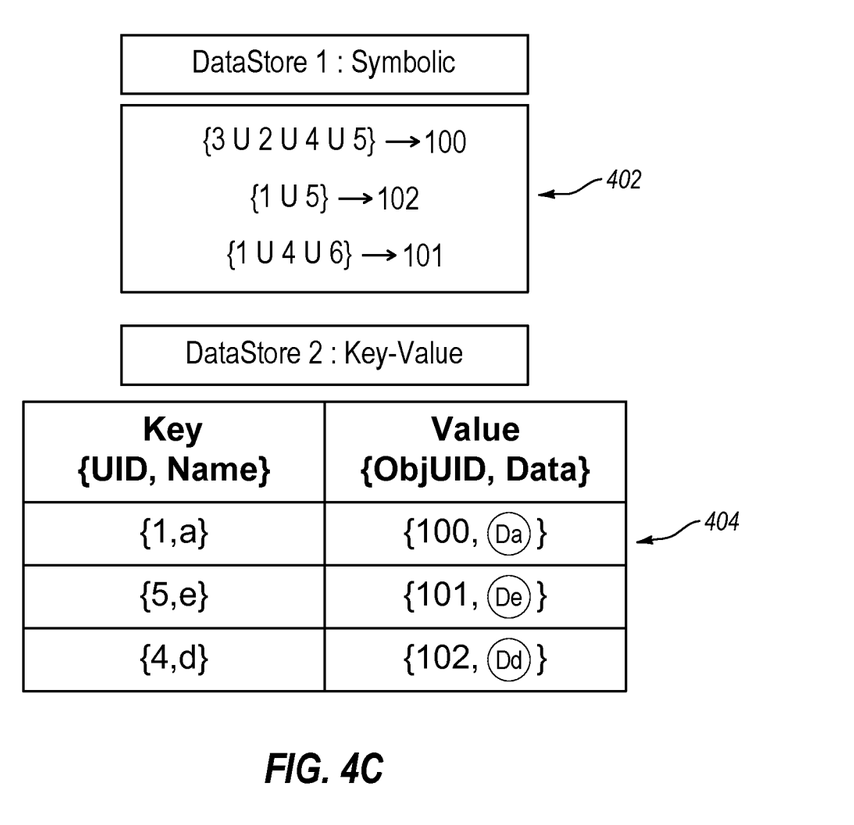
FIG. 4C is a block diagram of an example symbolic data store and an example key-value data store of an example symbolic hyper-graph database.

As disclosed in FIGS. 4A and 4B, the node 1 is connected with similar edges to a set of multiple hyper-graph nodes 3, 2, 4, and 5. The union of the set of multiple hyper-graph nodes 3, 2, 4, and 5 is represented in FIGS. 4B-4C by a unique identifier 100. As disclosed in FIG. 4C, this union of the set of multiple hyper-graph nodes 3, 2, 4, and 5 represented by the unique identifier 100 is stored in a symbolic data store 402 that may correspond to the symbolic data store 302 of FIG. 3. The associated attribute information for the edges that connect the node 1 to the nodes 3, 2, 4, and 5 is stored in a key-value data store 404 that may correspond to the key-value data store 304 of FIG. 3.

In a similar fashion, FIGS. 4A and 4B disclose that the node 4 is connected with similar edges to a set of multiple hyper-graph nodes 1 and 5, which is represented in FIGS. 4B-4C by a unique identifier 102. As disclosed in FIG. 4C, this set 102 is stored in the symbolic data store 402. The associated attribute information for the edges that connect the node 4 to the nodes 1 and 5 is stored in the key-value data store 404. Also, FIGS. 4A and 4B disclose that the node 5 is connected with similar edges to a set of multiple hyper-graph nodes 1, 4, and 6, which is represented in FIGS. 4B-4C by a unique identifier 101. As disclosed in FIG. 4C, this set 101 is stored in the symbolic data store 402. The associated attribute information for the edges that connect the node 5 to the nodes 1, 4, and 6 is stored in the key-value data store 404.

The symbolic data store 402 may employ a persistent BDD to symbolically store each set of multiple hyper-graph nodes. For example, the symbolic data store 402 may employ an e3BDD to symbolically store each set of multiple hyper-graph nodes. An e3BDD is defined herein as a BDD where each BDD node has a node type of a standard node, a zero-suppressed reduction node or a one-suppressed reduction node. An e3BDD generally employs node elimination to reduce the number of nodes in a BDD and thus help reduce the storage space required to store a BDD structure.

Figure 5A:
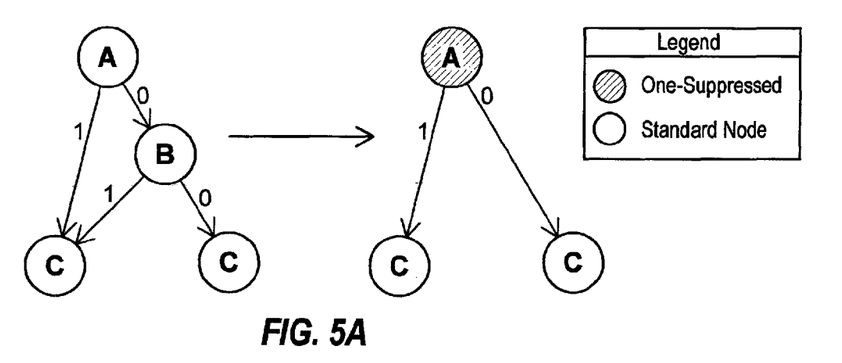
FIG. 5A schematically illustrates a process flow for a one-suppressed node elimination in an example three element binary decision diagram (e3BDD)

FIG. 5A schematically illustrates a process flow for a one-suppressed node elimination in an example e3BDD. As disclosed in FIG. 5A, node A and node B may be reduced using one-suppressed node elimination to change node A into a one-suppressed reduction node and to eliminate node B without losing data from the original BDD.

Figure 5B:
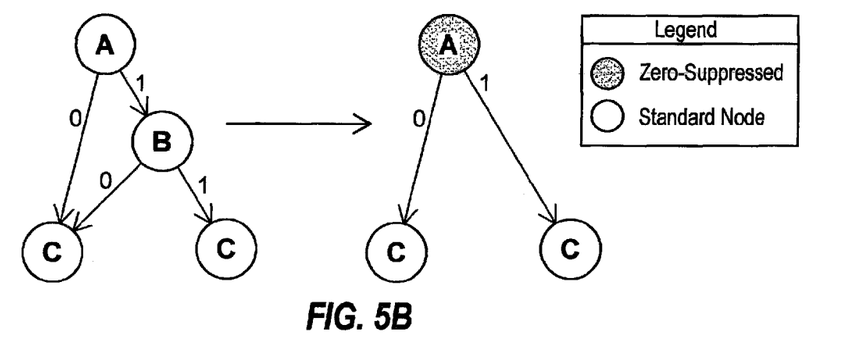
FIG. 5B schematically illustrates a process flow for a zero-suppressed node elimination in an example e3BDD.

FIG. 5B schematically illustrates a process flow for a zero-suppressed node elimination in an example e3BDD. As disclosed in FIG. 5B, node A and node B may be reduced using zero-suppressed node elimination to change node A into a zero-suppressed reduction node and to eliminate node B without losing data from the original BDD.

Figure 5C:
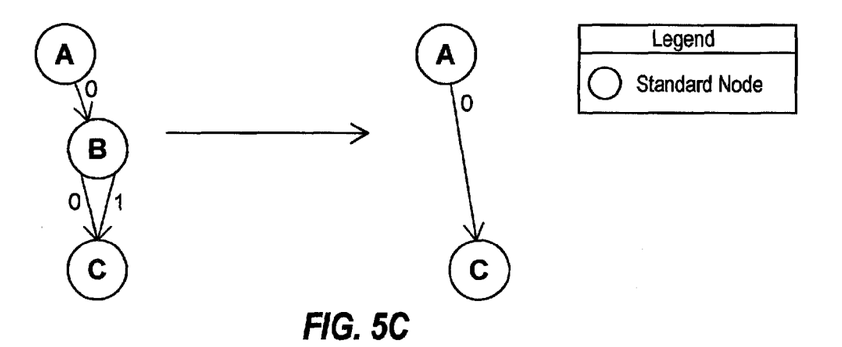
FIG. 5C schematically illustrates a process flow for a redundant node elimination in an example e3BDD.

FIG. 5C schematically illustrates a process flow for a redundant node elimination in an example e3BDD. As disclosed in FIG. 5C, node A and node B may be reduced using one-suppressed node elimination to eliminate node B without losing data from the original BDD.

Figure 6:
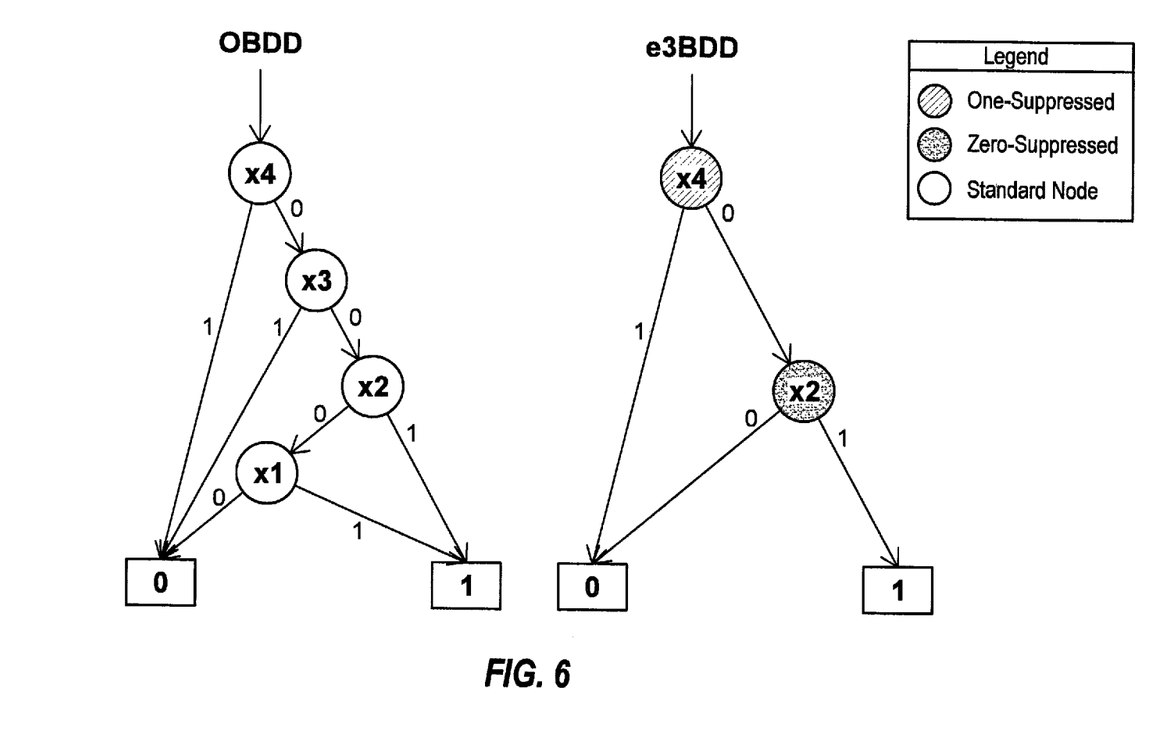
FIG. 6 schematically illustrates a process flow for a node elimination in an example e3BDD.

FIG. 6 schematically illustrates a process flow for node elimination in an example e3BDD. As disclosed in FIG. 6, nodes x4, x3, x2, and x1 may be reduced using one-suppressed node elimination and zero-suppressed node elimination. In particular, node x4 is changed into a one-suppressed reduction node, node x2 is changed into a zero-suppressed reduction node, and node x3 and node x1 are eliminated, all without losing data from the original ordered BDD (OBDD). In at least some example embodiments, an e3BDD may be employed to help reduce the storage space required to store a BDD structure.

Figure 7A:
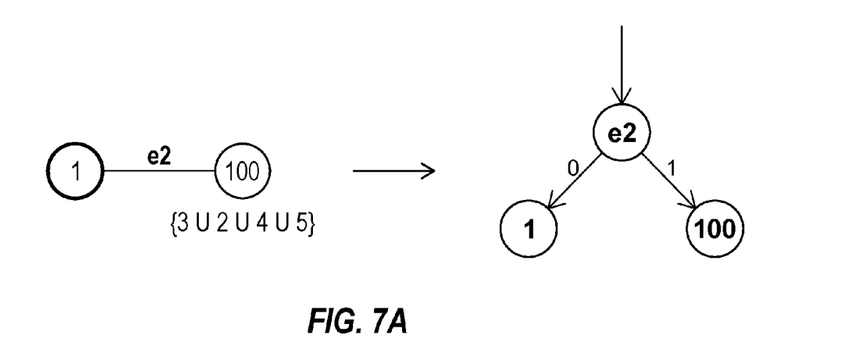
FIG. 7A schematically illustrates a process flow for symbolically storing a hyper-graph edge as a binary decision diagram (BDD)

FIG. 7A schematically illustrates a process flow for symbolically storing a hyper-graph edge as a BDD. As noted above in connection with FIGS. 4B-4C, the union of the set of multiple hyper-graph nodes 3, 2, 4, and 5 is represented in FIGS. 4B-4C by a unique identifier 100. As disclosed in FIG. 7A, the hyper-graph edge e2 that connects the set of multiple hyper-graph nodes 3, 2, 4, and 5 to the hyper-graph node 1 can be stored as a BDD where the edge e2 is connected to the hyper-graph node 1 on its zero (0) branch and is connected to the set of multiple hyper-graph nodes 3, 2, 4, and 5 represented by the unique identifier 100 on its one (1) branch. Thus, FIG. 7A demonstrate that a BDD, such as the e3BDD disclosed herein, may be employed to symbolically store a hyper-graph edge, in addition to symbolically storing a set of multiple hyper-graph nodes.

Figure 7B:
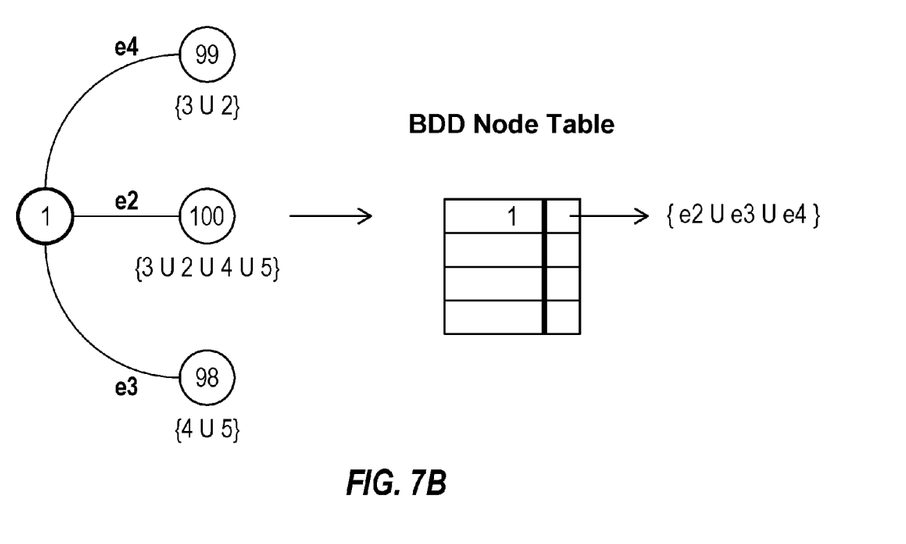
FIG. 7B schematically illustrates a process flow for symbolically storing a set of multiple hyper-graph edges in a BDD node table.

FIG. 7B schematically illustrates a process flow for symbolically storing a set of multiple hyper-graph edges in a BDD node table. As disclosed in FIG. 7B, various hyper-graph edges related to a single node 1 can be symbolically stored. For example, the hyper-graph edge e4 represents the edges between the hyper-graph node 1 and the set of multiple hyper-graph nodes 3 and 2 represented by the unique identifier 99; the hyper-graph edge e2 represents the edges between the hyper-graph node 1 and the set of multiple hyper-graph nodes 3, 2, 4, and 5 represented by the unique identifier 100; and the hyper-graph edge e3 represents the edges between the hyper-graph node 1 and the set of multiple hyper-graph nodes 4 and 5 represented by the unique identifier 98. The set of multiple hyper-graph edges e2, e3, and e4 may then be symbolically stored in a BDD node table as each being a set of hyper-graph edges related to the hyper-graph node 1. Thus, a set of multiple hyper-graph edges may be symbolically stored as a BDD in a BDD node table.

Figure 8:
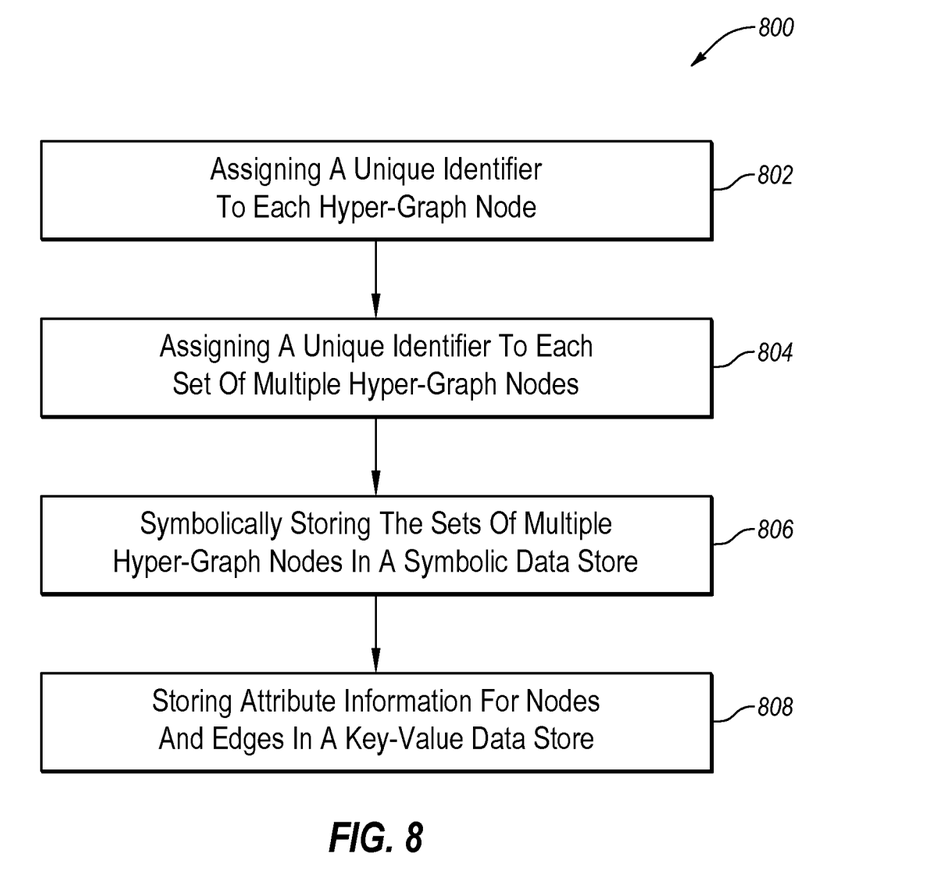
FIG. 8 is a flowchart of an example method for implementing a graph database.

FIG. 8 illustrates a method 800 of implementing a graph database, such as the hyper-graph database 300 of FIG. 3, arranged in accordance with at least some embodiments described herein.

To commence, at block 802 a unique identifier is assigned to each hyper-graph node. For example, as disclosed in FIG. 4A, the unique identifiers 1-6 are assigned to the hyper-graph nodes in the graph 400.

At block 804, a unique identifier is assigned to each set of multiple hyper-graph nodes. For example, as disclosed in FIGS. 4A and 4B, the unique identifier 100 is assigned to the set of multiple hyper-graph nodes 3, 2, 4, and 5; the unique identifier 102 is assigned to the set of multiple hyper-graph nodes 1 and 5; and the unique identifier 101 is assigned to the set of multiple hyper-graph nodes 1, 4, and 6.

At block 806, the sets of multiple hyper-graph nodes are symbolically stored in a symbolic data store. For example, as disclosed in FIG. 4C, the unique identifiers 100, 102, and 101 are symbolically stored along with their corresponding sets of multiple hyper-graph nodes in the symbolic data store 402. As noted previously, each of the sets of multiple hyper-graph nodes corresponding to the unique identifiers 100, 102, and 101 can be symbolically stored as a BDD, such as an e3BDD.

At block 808, attribute information for nodes and edges is stored in a key-value data store. For example, as disclosed in FIG. 4C, attribute information for the nodes 1-6 and the edges corresponding to the nodes 106 may be stored in the key-value data store 404.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

Thus, each example symbolic hyper-graph database disclosed herein is bifurcated between two separate data stores, namely, a symbolic data store and a key-value data store. This bifurcation allows the storage of increasing graph data, which is relatively large in size, in a distributed and efficient manner. Further, at least some example symbolic hyper-graph databases are efficiently distributed across multiple database servers. In at least some example embodiments, graph-based operations such as finding a minimum path between two nodes or finding a minimum spanning tree may be calculated efficiently using the symbolic data stores disclosed herein. These operations may be useful in analyzing social graphs.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may comprise non-transitory computer-readable media such as RAM, ROM, EEPROM, CD-ROM or other optical disk storage, magnetic disk storage or other magnetic storage devices, or any other non-transitory medium which may be used to carry or store desired program code means in the form of computer-executable instructions or data structures and which may be accessed by a general purpose or special purpose computer. Combinations of the above should also be included within the scope of computer-readable media.

Computer-executable instructions comprise, for example, instructions and data which cause a general purpose computer, special purpose computer, or special purpose processor to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the scope of the claimed invention.

What is claimed is:

1. A graph database comprising:
   at least one non-transitory computer-readable medium including:
   one or more symbolic data stores configured to symbolically store sets of multiple hyper-graph nodes;
   one or more of the multiple hyper-graph nodes associated with a first unique identifier including one or more first global keys and a first local key, the one or more first global keys including a binary integer associated with a database server and the first local key uniquely identifying the one or more multiple hyper-graph nodes stored on the database server;
   a second unique identifier including one or more second global keys and a second local key and identifying a set of multiple hyper-graph nodes representing a set operation of a union of hyper-graph nodes with comparable relationships based on having similar edges; and
   one or more key-value data stores configured to store attribute information for hyper-graph nodes and hyper-graph edges, the attribute information including a first symbolic key and a first value, the first symbolic key identifying at least one of the one or more hyper-graph nodes symbolically stored by the one or more symbolic data stores, and the first value including an object key and data that is associated with the object key, the attribute information also including a second symbolic key and a second value associated with the set of multiple hyper-graph nodes representing the set operation;
   wherein each set is stored as a three element binary decision diagram (e3BDD).

2. The graph database according to claim 1, wherein each set has a unique identifier.

3. The graph database according to claim 2, wherein each node has a unique identifier.

4. The graph database according to claim 3, wherein each unique identifier comprises:
   the global key which identifies the database server in a distributed group of interconnected database servers in which information regarding the set or the node is stored; and
   the local key which uniquely identifies the set or the node on the database server.

5. The graph database of claim 1, wherein the binary integer included in the one or more global keys is configured to be padded with one or more leading zeroes to accommodate expansion of the number of binary digits in the global key responsive to additional database servers being added.

6. The graph database of claim 1, wherein at least one e3BDD includes nodes having node types of:
   a standard node;
   a zero-suppressed reduction node generated by zero-suppressed node elimination of a first original binary decision diagram (BDD); and
   a one-suppressed reduction node generated by one-suppressed node elimination of a second original BDD.

7. A method of implementing a graph database comprising:
   symbolically storing sets of multiple hyper-graph nodes in one or more symbolic data stores, one or more of the multiple hyper-graph nodes associated with a first unique identifier including one or more first global keys and a first local key, the one or more first global keys including, a binary integer associated with a database server and the first local key uniquely identifying the one or more multiple, hyper-graph nodes stored on the database server, at least one of the sets of multiple hyper-graph nodes representing a set operation of a union of hyper-graph nodes with comparable relationships based on having similar edges, each hyper-graph node in the at least one of the sets of multiple hyper-graph nodes also being stored with its own unique identifier;
   associating a second unique identifier, including one or more second global keys and a second local key, with each of the one or more sets of multiple hypergraph nodes representing the set operation; and
   storing attribute information for nodes and edges in one or more key-value data stores, including for the at least one of the sets of multiple hyper-graph nodes, the attribute information including a symbolic key and a value, the symbolic key identifying at least one of the multiple hyper-graph nodes symbolically stored by the one or more symbolic data stores, and data that is associated with the object key;
   wherein each set, each node, and each edge is stored as a three element BDD (e3BDD).

8. The method according to claim 7, further comprising assigning a unique identifier to each of the sets and the nodes.

9. The method according to claim 8, wherein each unique identifier comprises:
   the global key which identifies the database server in a distributed group of interconnected database servers in which information regarding the set or the node is stored; and
   the local key which uniquely identifies the set or the node on the database server.

10. The method of claim 7, wherein at least one e3BDD includes nodes having node types of:
    a standard node;
    a zero-suppressed reduction node generated by zero-suppressed node elimination of a first original binary decision diagram (BDD); and
    a one-suppressed reduction node generated by one-suppressed node elimination of a second original BDD.

11. A non-transitory computer-readable medium storing a program that causes a processor to execute a method of implementing, a graph database comprising:
    symbolically storing sets of multiple hyper-graph nodes in one or more symbolic data stores, one or more of the multiple hyper-graph nodes associated with a first unique identifier including, one or more first global keys and a first local key, the one or more first global keys including a binary integer associated with a database server and the first local key uniquely identifying the one or more multiple hyper-graph nodes stored on the database server, at least one of the sets of multiple hyper-graph nodes representing a set operation of a union of hyper-graph nodes with comparable relationships based on having similar edges, each hyper-graph node in the at least one of the sets of multiple hyper-graph nodes also being, stored with its own unique identifier;

associating a second unique identifier, including one or more second global keys and a second local key, with each of the one or more sets of multiple hyper-graph nodes representing the set operation; and storing attribute information for nodes and edges in one or more key-value data stores, including for the at least one of the sets of multiple hyper-graph nodes, the attribute information including a symbolic key and a value, the symbolic key identifying at least one of the multiple hyper-graph nodes symbolically stored by the one or more symbolic data stores, and data that is associated with the object key;

wherein each set, each node, and each edge is stored as a three element BDD (e3BDD).

12. The non-transitory computer-readable medium according to claim 11, wherein the program further causes the processor to assign a unique identifier to each of the sets and the nodes.

13. The non-transitory computer-readable medium according to claim 12, wherein each unique identifier comprises:

the global key which identifies the database server in a distributed group of interconnected database servers in which information regarding the set or the node is stored; and the local key which uniquely identifies the set or the node on the database server.

14. The non-transitory computer-readable medium of claim 11, wherein at least one e3BDD includes nodes having node types of:

a standard node;

a zero-suppressed reduction node generated by zero-suppressed node elimination of a first original binary decision diagram (BDD); and a one-suppressed reduction node generated by one-suppressed node elimination of a second original BDD.

15. A system, comprising:

a processor;

a non-transitory computer-readable medium storing a program that causes the processor to execute an implementation of a three element binary decision diagram (e3BDD) that are each configured to be employed in symbolically storing a set of multiple hyper-graph nodes, one or more of the multiple hyper-graph nodes associated with a first unique identifier including one or more first global keys and a first local key, the one or more first global keys including a binary integer associated with a database server and the first local key uniquely identifying the one or more multiple hyper-graph nodes stored on the database server, the set of multiple hyper-graph nodes representing a set operation of a union of hyper-graph nodes with comparable relationships based on having similar edges, each hyper-graph node in the set of multiple hyper-graph nodes also being stored with its own unique identifier;

associating a second unique identifier, including one or more second global keys and a second local key, with each of the one or more sets of multiple hyper-graph nodes representing the set operation;

and wherein the program is further configured to cause the processor to store attribute information for nodes and edges in one or more key-value data stores including for the at least one of the sets of multiple hyper-graph nodes, the attribute information including a symbolic key and a value, the symbolic key identifying at least one of the multiple hyper-graph nodes symbolically stored by the one or more symbolic data stores, and data that is associated with the object key.

16. The system according to claim 15, wherein each e3BDD comprises a persistent e3BDD.

17. The system of claim 15, wherein at least one e3BDD includes nodes having node types of:

a standard node;

a zero-suppressed reduction node generated by zero-suppressed node elimination of a first original binary decision diagram (BDD); and a one-suppressed reduction node generated by one-suppressed node elimination of a second original BDD.

* * * * *